(12) United States Patent
Xie et al.

(10) Patent No.: US 8,585,848 B2
(45) Date of Patent: Nov. 19, 2013

(54) METHOD OF CREATING WRINKLE STRUCTURES FOR REVERSIBLE AND IRREVERSIBLE APPLICATIONS

(75) Inventors: Tao Xie, Troy, MI (US); Junjun Li, Warren, MI (US); Maria T. Dekimpe, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 13/035,420

(22) Filed: Feb. 25, 2011

(65) Prior Publication Data

US 2012/0216945 A1   Aug. 30, 2012

(51) Int. Cl.
 *B32B 37/00* (2006.01)
(52) U.S. Cl.
 USPC ............ 156/164; 156/160; 156/163; 156/229
(58) Field of Classification Search
 USPC .................. 156/160, 136, 164, 281, 229, 16
 See application file for complete search history.

(56) References Cited

U.S. PATENT DOCUMENTS

| 2005/0218710 A1 | 10/2005 | Browne et al. |
| 2008/0262188 A1 | 10/2008 | Xie et al. |
| 2011/0253288 A1 | 10/2011 | Xie et al. |

FOREIGN PATENT DOCUMENTS

WO   WO-2008/121784 A   * 10/2008

OTHER PUBLICATIONS

Fu, hi-Cheng, et al "Tunable Nanowrinkles on Shape Memory Polymer Sheets", Advanced Materials, 2009, 21, pp. 1-5.*
Alexandra Schweikart, Andreas Fery; "Controlled wrinkling as a novel method for the fabrication of patterned surfaces"; Apr. 7, 2009; p. 249-263.
Tao Xie, Xingcheng Xiao, Junjun Li, Ruomiao Wang; "Encoding Localized Strain History Through Wrinkle Based Structural Colors"; Sep. 13, 2010; p. 4390-4394.

* cited by examiner

*Primary Examiner* — Jeff Aftergut
(74) *Attorney, Agent, or Firm* — Harness, Dickey & Pierce, P.L.C.

(57) ABSTRACT

Methods of creating reversible and irreversible wrinkle structures are provided. A shape memory polymer is heated to a transition temperature and cooled while applying a first force. A rigid film layer is secured to the shape memory polymer to form a bilayer. The original shape of the shape memory polymer is recovered to create a first set of wrinkles in the rigid film layer. The bilayer is heated to the transition temperature and a second tensile force is applied to create a second set of wrinkles in the rigid film layer.

19 Claims, 3 Drawing Sheets

METHOD OF CREATING WRINKLE STRUCTURES FOR REVERSIBLE AND IRREVERSIBLE APPLICATIONS

FIELD

The present disclosure relates to methods for creating wrinkle structures for reversible and irreversible applications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The ability to control and strategically form wrinkles is useful in a variety of applications. Everyday items such as packaging materials or safety substrates are designed to selectively buckle or wrinkle under an applied load for protection. Material scientists use wrinkle formation to study the properties of materials and to design new materials. The resultant information can be applied to creating structural components, decorative components, and the like, in diverse fields such as nanotechnology, meteorology, electronics, sensors, biological devices, and material manipulation.

SUMMARY

This section provides a general summary of the disclosure, and is not a comprehensive disclosure of its full scope or all of its features.

In various embodiments, the present teachings provide methods of creating reversible and irreversible wrinkle structures. A shape memory polymer is heated to a transition temperature and cooled while applying a first force. A rigid film layer is secured to the shape memory polymer to form a bilayer. The original shape of the shape memory polymer is recovered to create a first set of wrinkles in the rigid film layer. The bilayer is heated to the transition temperature and a second force is applied to create a second set of wrinkles in the rigid film layer.

In other embodiments, the present teachings provide methods of creating reversible and irreversible wrinkle structures. A shape memory polymer is heated to a transition temperature. At least two zones of localized deformation are created by cooling the shape memory polymer while applying a first force. A rigid film layer is applied over the shape memory polymer to form a bilayer. The original shape of the shape memory polymer is recovered while creating a first set of wrinkles in the rigid film layer on at least one of the zones of localized deformation. The bilayer is heated to the transition temperature while applying a second force to create a second set of wrinkles in the rigid film layer. The second set of wrinkles is located immediately adjacent one of the zones of localized deformation.

In various embodiments, the present teachings provide methods of creating a wrinkled structure. A rigid film layer is secured to a two-way shape memory polymer to form a bilayer. The bilayer is heated to a transition temperature and a first force is applied to change a dimension of the bilayer. The bilayer is subsequently heated and cooled while maintaining the first force.

In still other embodiments, the present teachings provide methods of creating a plurality of reversible and irreversible wrinkle structures. A shape memory polymer is heated to a transition temperature and cooled while applying a first force at a plurality of discrete regions on the shape memory polymer. The shape memory polymer is combined with a rigid film layer to form a bilayer. An original shape of the shape memory polymer is recovered while creating a plurality of first sets of wrinkles in the rigid film layer. The bilayer is heated to the transition temperature and a second force is applied to create a plurality of second sets of wrinkles in the rigid film layer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
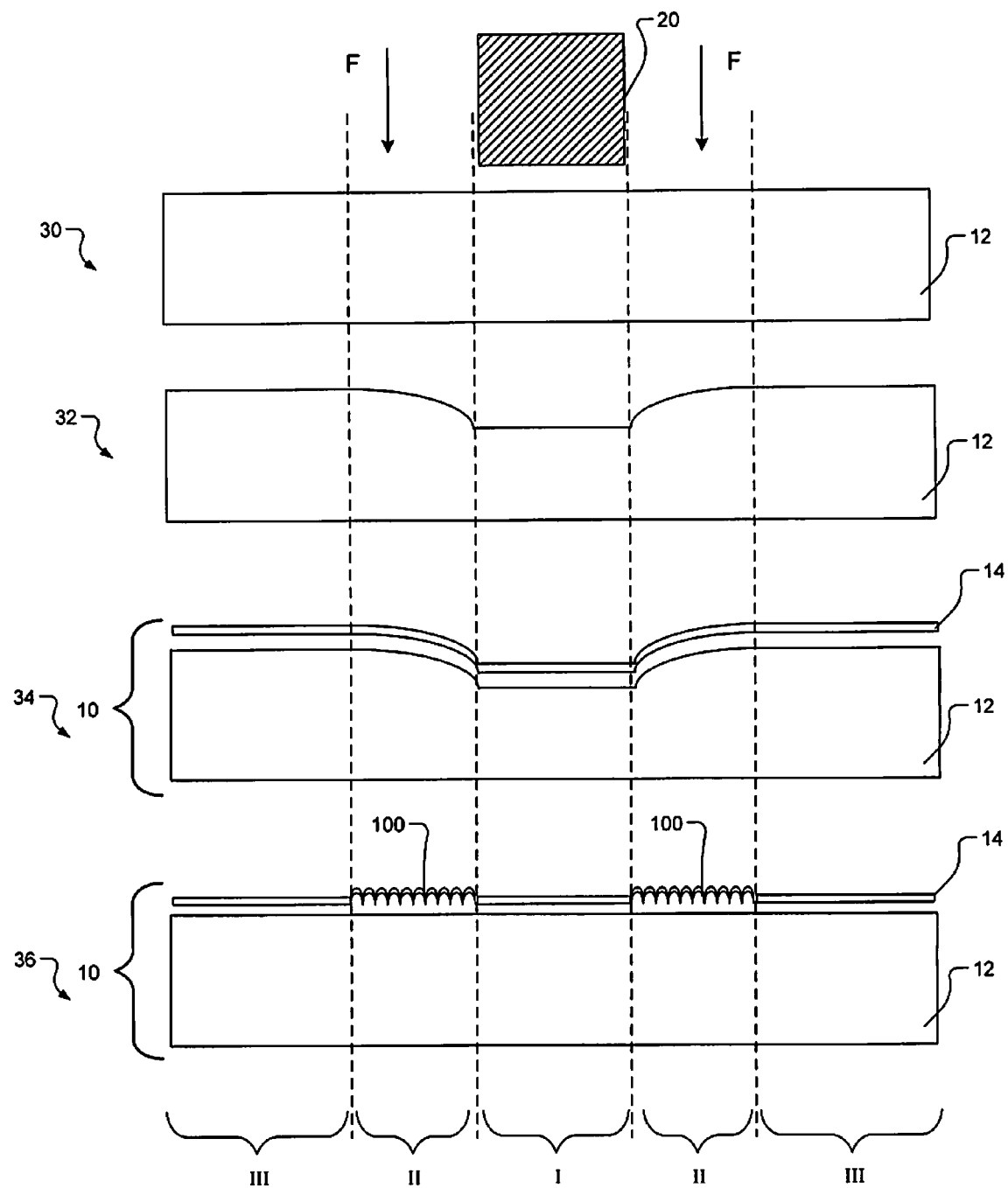
FIG. 1 depicts a side-view of a process of creating a set of irreversible wrinkles on a surface.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Also, as used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges disclosed herein are inclusive of the endpoints and independently combinable.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

Referring to FIGS. 1-5, the present teachings relate to methods of manipulating a bilayer 10 made of a shape memory polymer (SMP) layer 12 as covered by a rigid film layer 14 to include wrinkled structures such as irreversible wrinkles 100 and/or reversible wrinkles 200. While the present disclosure illustrates and describes two-layers (or the bilayer 10), it is understood that any other numbers of layers, including a single layer, are within the scope of the present teachings. As non-limiting examples, systems including three, six, eighteen, or seventy-five full or partial layers, including all intermediary values, are within the scope of the present teachings.

As used herein, "reversible wrinkles" are temporarily fixed after formation and are present on the shape memory polymer 12 when it is in a deformed shape but are not present when the shape memory polymer 12 is in its original shape. In various embodiments, reversible wrinkles 200 can be selectively removed from or replaced on the bilayer 10, as will be detailed later herein. "Irreversible wrinkles" are permanently fixed after formation of and are present on the shape memory polymer 12 when in its original shape and in any deformed shapes. In various embodiments, irreversible wrinkles 100 cannot be selectively removed from the shape memory polymer, as will be detailed later herein. For clarity, a general description of shape memory polymers is provided first, followed by specific information on the methods of the present teachings.

Shape Memory Polymers

As used herein, the term "shape memory polymer" generally refers to a polymeric material, which in response to an activation has a change in physical properties such as elastic modulus, configuration, shape, size, and combinations thereof. Shape memory polymers can be fixed into deformed, temporary shapes and recover to their permanent shapes only when exposed to an external stimulus, most typically heat. Exemplary shape memory polymers include those generally categorized as thermoplastics, thermosets, interpenetrating networks, semi-interpenetrating networks, or mixed networks of polymers.

A shape memory polymer can be formed of components including, but not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), poly-caprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly (lauryl methacrylate), poly(phenyl methacrylate), poly(methyl acrylate), poly(isopropyl acrylate), poly(isobutyl acrylate) and poly(octadecyl acrylate). It is understood that a blend of polymers, branched polymers, and polymers with side chains are also part of the present teachings.

In various embodiments, the shape memory polymers include at least two different segments (or sequence of the same or similar monomer or oligomer units) that, as combined, contribute differently to the properties of the shape memory polymer. Generally, each segment has its own melting point or glass transition temperature (Tg), respectively. Segments may be classified as hard segments or soft segments, where the hard segment has a higher thermal transition temperature than a soft segment. The particular number of segments correlates with the number of transition temperatures in the shape memory polymer. The lowest transition temperature of all segments is the "first transition temperature" while the highest transition temperature of any segment is the "last transition temperature." It is understood that in a multi-segment system, there may be segments that share transition temperatures.

When the shape memory polymer is heated to a selected temperature, such as by application of resistive heating, heat convection, hot gas, steam, hot liquid, or electrical current, as non-limiting examples, the shape can be deformed and the deformed shape can be temporarily fixed. A temporary shape of the shape memory polymer can be set by heating the shape memory polymer to a temperature above the last transition temperature, applying a force or external stress to deform the shape memory polymer, and cooling the shape memory polymer below the last transition temperature. The cooling can be achieved by exposure to a cold gas, refrigerant components, cooling probe, a cool blower, and the like. It is understood that the heating and cooling techniques listed above are suitable for each transition temperature and for causing permanent or temporary shapes in the shape memory polymer.

The shape memory polymer can recover to its original or its permanent shape from a temporary shape by heating the material without application of the stress or load to a temperature above the particular shape memory transition temperature.

For shape memory polymers with only two segments, the temporary shape of the shape memory polymer is set at the first transition temperature, followed by cooling of the shape memory polymer, while under load, to fix the temporary shape. The temporary shape is maintained as long as the shape memory polymer remains below the first transition temperature. The permanent shape is regained when the shape memory polymer is once again brought above the first transition temperature with the load removed. Repeating the heating, shaping, and cooling steps can repeatedly reset the temporary shape.

Some shape memory polymers exhibit a "one-way" or a "two-way" effect, wherein the shape memory polymer exhibits one or two permanent shapes, respectively. For the one-way effect, heating the shape memory polymer above a transition temperature without a stress or load leads to the permanent shape, and reversion to the temporary shape is not possible unless an external deformation force is applied. With respect to the two-way effect, the shape memory polymer can switch between a first shape and a second shape reversibly upon temperature change alone (i.e., the external force is constant).

Methods

Turning to FIGS. 1-5, the present teachings provide versatile methods to create localized structural colors using surface wrinkling on a bilayer 10 formed of a rigid film layer 14 disposed on a shape memory polymer layer 12. The wrinkled surface may show structural colors when the wavelength is in the range of visible light. The rigid film 14 can be made of any suitable material such as metals, including alloys, polymers, or inorganic films, such as silicon dioxide or titanium dioxide, and combinations thereof. The shape memory polymers can be selected from those described above. The present teachings provide surprising ways of forming both reversible and irreversible wrinkles on the same substrate surface without the use of traditional lithographic techniques.

Referring to FIG. 1, as shown at element 30, the shape memory polymer 12 is in its original shape. The shape memory polymer 12 is heated above its shape memory transition temperature. The heating is achieved by application of resistive heating, heat convection, hot gas, steam, hot liquid, or electrical current, as non-limiting examples. One skilled in the art appreciates that the exact transition temperature is based on the particular shape memory polymer chosen. For example, with certain epoxy-based polymers, a transition temperature may be about 80 degrees C. While the shape memory polymer 12 is at the appropriate transition temperature, an indenter 20, that is either flat, rounded, or has another suitable shape, is pressed into the shape memory polymer layer 12 with a force applied in the direction of arrow F to create a deformation.

As best illustrated at elements 32 and 34 of FIG. 1, the application of the force F creates a series of distinct Zones, identified as Zones I, II, and III as indicated by the dashed lines, which transverse elements 30-36 for clarity. Zone I includes the indented area, where, as depicted, only a compressive strain in the vertical direction is created. Zone II is a transition area where the strain consists of a compressive component in the vertical direction and a tensile component in the lateral direction. This causes the respective curves in the Zone II area immediately after the indentation. Zone III is adequately remote from the force F applied by the indenter 20 to prevent its deformation.

Although a single indenter 20 and resultant deformation are depicted, it is understood that a plurality of discrete or different wrinkles and discrete sets of Zones can be formed by using multiple indenters 20 simultaneously or by sequentially forming a series of deformations using a single indenter 20. It is also understood that in such embodiments, there may be overlap between adjacent zones (for example, a Zone III from a first deformation adjacent a Zone III from a second deformation) of discrete deformations and which may modify the wrinkle pattern.

With further reference to element 32, after creating the deformation, the deformed shape memory polymer layer 12 is cooled under the same load to a temperature below the shape memory transition temperature to retain the deformed shape. The cooling can be achieved by exposure to a cold gas, refrigerant components, cooling probe, a cool blower, and the like. After cooling, the load is removed and the deformation is temporarily fixed in the shape memory polymer layer 12.

As shown at element 34 in FIG. 1, a rigid film layer 14 is subsequently deposited onto the shape memory polymer layer 12 to form the bilayer 10. Notably, the rigid film layer 14 follows the general contour of the underlying shape memory polymer 12. All or a portion of the rigid film layer 14 can be secured to the shape polymer layer 12. For clarity, a small space is depicted between the shape memory polymer 12 and the rigid film layer 14. It is understood that the small space may not be present in an actual bilayer 10 because the layers are secured together.

Figure 2:
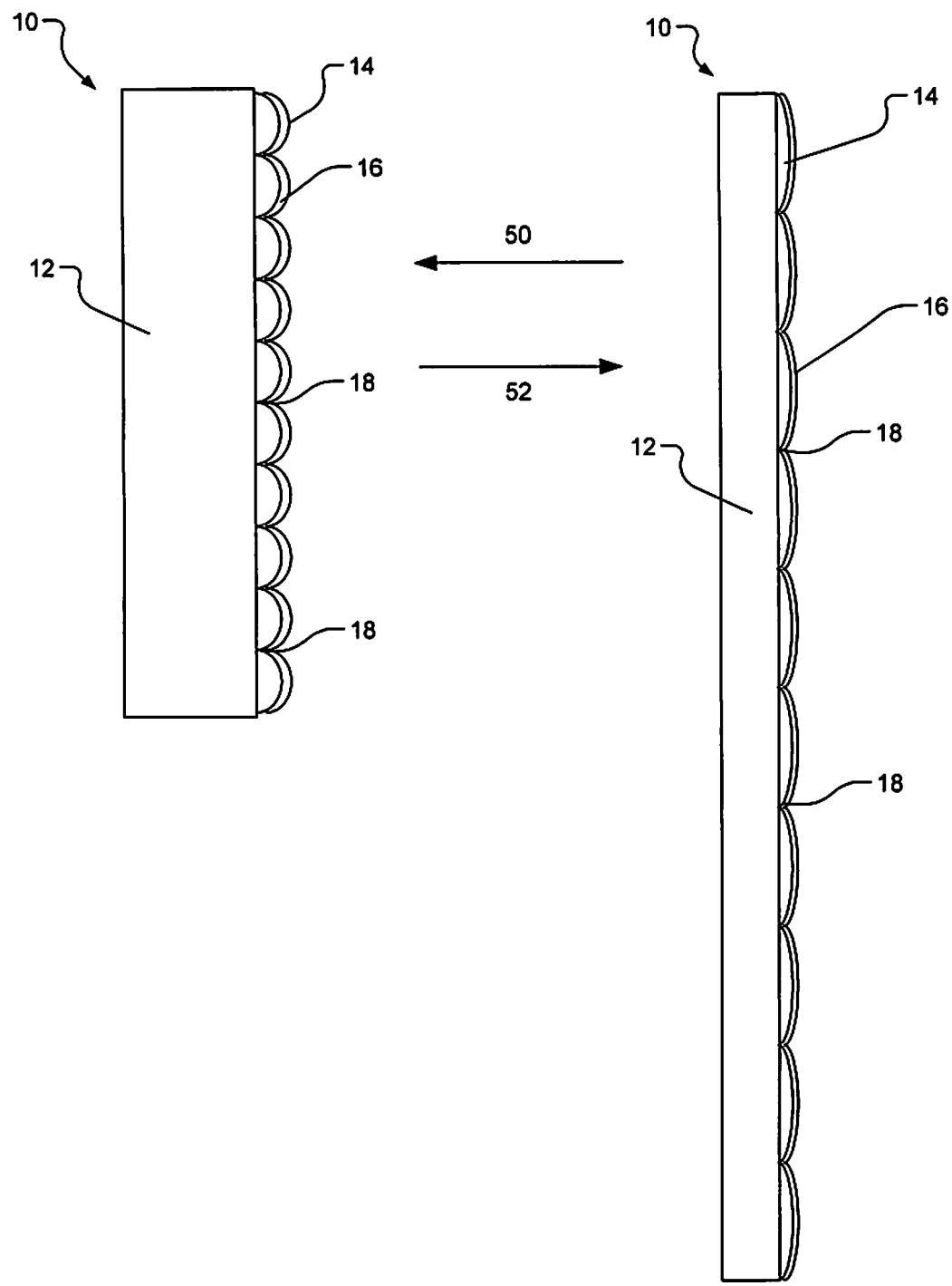
FIG. 2 depicts a side-view of an undulated material.

Similarly, as shown in FIG. 2, the rigid film layer 14 is deposited on the underlying shape memory polymer 12. However, the rigid film layer 14 of FIG. 2 includes a series of waves or undulations 16 that provide a ribbon-like shape. The ribbon-like shape can be secured at selected attachment points 18 along the shape memory polymer 12, for example. It is understood that the entire length of the ribbon-like shape need not be directly attached to the shape memory polymer 12. While the waves or undulations 16 are shown as being rounded and relatively consistent in spacing, it is understood that a plurality of spacing combinations, random spacing, varied shape waves such as spikes or a series of flats (similar to the shape of a duty cycle chart, as a non-limiting example), and combinations thereof are within the scope of the present teachings.

Depending on the type of rigid film selected, the rigid film layer 14 can be disposed on the shape memory polymer layer 12 by any suitable means, including, but not limited to, chemical vapor deposition, physical vapor deposition, delamination, exposure to UV light and curing, various other techniques, and combinations thereof. Generally, the shape memory polymer layer 12 is thicker than the rigid layer 14. The thickness of the rigid film layer 14 can be from about 5 to about 100 nanometers, including all sub-ranges therebetween. The rigid film layer 14 can also be as thin as a monolayer of the rigid film material.

Returning to FIG. 1, after the rigid film layer 14 deposition, the resultant bilayer 10 is heated above the transition temperature again, which induces the shape recovery (or returning to substantially the original shape as shown at element 30) as best shown at element 36. As stated above, a small space is depicted between the shape memory polymer 12 and the rigid film layer 14 for clarity. It is understood that the small space may not be present in an actual bilayer 10 because the layers are secured together.

Notably, Zone I recovers to its original orientation (as depicted in element 30), and the thin film is urged upwards in the vertical direction and induces no strain in the thin film. In Zone II, however, the rigid film layer 14 also moved upwards, but the recovery of the strain creates lateral compression on the rigid film layer 14. Because the compressive strain exceeds a critical value of the rigid film layer 14 material, wrinkles 100 are formed on the surface. In certain instances, this may or may not also cause slight "puckering" in the underlying shape memory polymer 12 along the wrinkled regions of the rigid film layer 14. It is understood that if the slight puckering occurs, it does not substantially alter the original shape of the shape memory polymer 12. The wrinkles 100 are irreversible because the strain on the rigid film layer 14 while the shape memory polymer 12 is in its original shape cannot be removed. It is understood that strain on the rigid film layer 14 can also be introduced using a thermal mismatch, release of mechanical stretching, capillary force, swelling, solvent diffusion, and combinations thereof.

With respect to FIG. 2, in various embodiments, the rigid film layer is secured to a two-way shape memory polymer 12 to form the bilayer 10. As illustrated, the rigid film layer 14 includes ten undulations 16. As indicated by arrow 52, the bilayer 10 is heated to a transition temperature and a first force is applied to change a dimension of the bilayer 10. Notably, the ten undulations 16 are elongated after heating and the amplitude of the undulations 16 decreases when the force is applied to elongate or otherwise modify the original or starting dimension of the shape memory polymer 12. As indicated by arrow 50, heating and subsequently cooling while applying the same first force will recover the dimensions of the bilayer 10 including the amplitude of the undulations 16 on the shape memory polymer 12. The process can be repeated by cycling through the parameters of arrows 50 and 52. It is believed that inclusion of the undulations or a ribbon-like structure with discrete attachment points 18 facilitates creation of wrinkles 100 or 200 while minimizing the cracking of the rigid film layer 14. While the wrinkles 100 or 200 are not depicted in FIG. 2, it is understood that in such embodiments, the wrinkles 100 or 200 are generally formed and removed, as applicable, along the direction of the applied stress.

Figure 3:
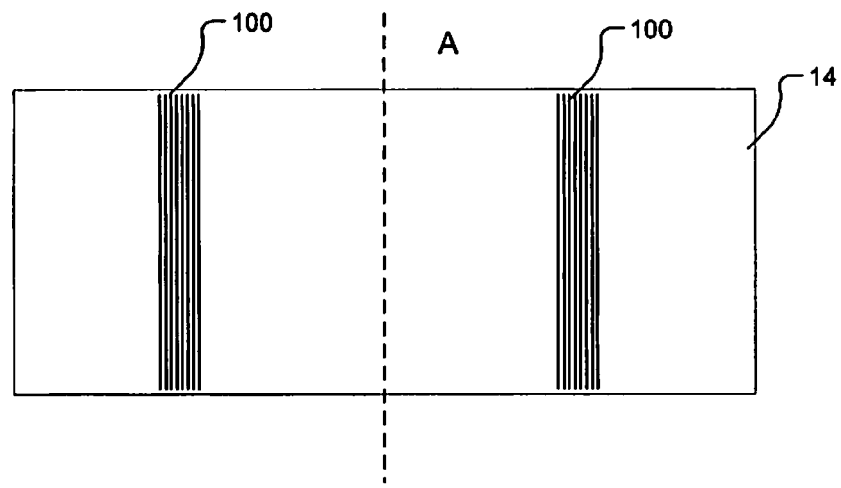
FIG. 3 depicts a top-view of a surface having a set of irreversible wrinkles.

Turning to FIG. 3, the reversible wrinkles 200 are formed by applying a force to the bilayer 10 with respect to axis A. In various embodiments, the force may be uniaxial or biaxial, or it may be applied in the same or a different direction and/or amount as the force exerted by the indenter 20 in FIG. 1. The force is applied while heating the bilayer 10 above the transition temperature. The heated and stretched bilayer 10 is cooled while maintaining the force to create the reversible wrinkles 200.

Figure 4:
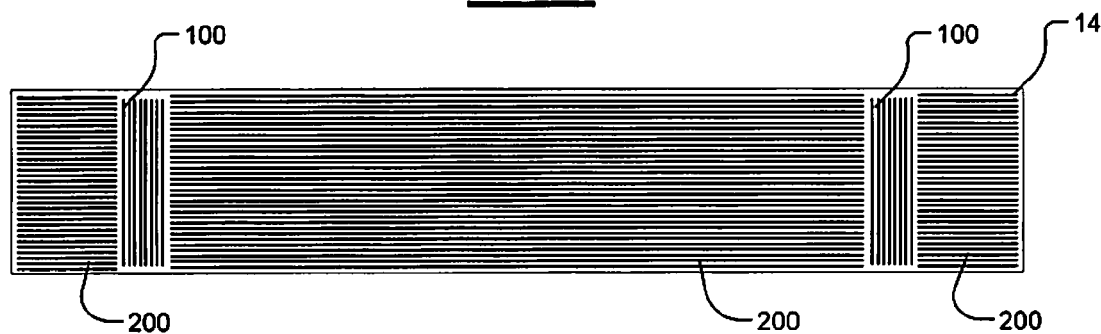
FIG. 4 depicts a top-view of a surface having a set of irreversible and reversible wrinkles.
Figure 5:
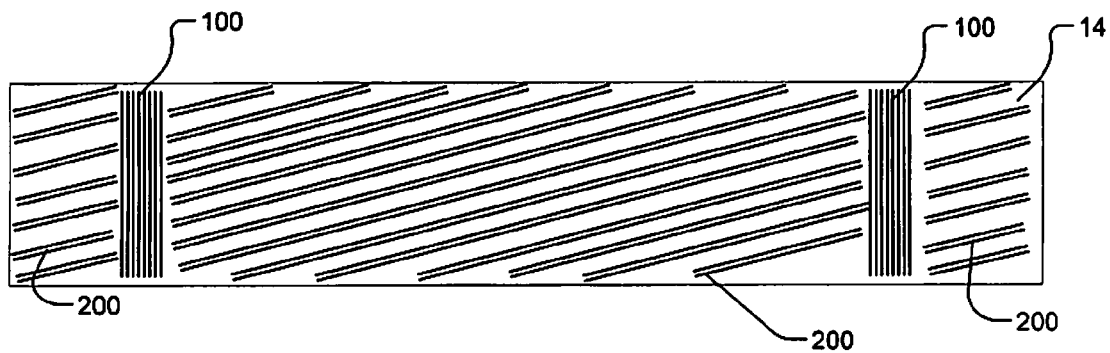
FIG. 5 depicts a top-view of a surface having a set of irreversible and reversible wrinkles.

As shown in FIG. 4, a force applied perpendicularly to the axis A of FIG. 3 while applying heat to the system will provide elongated wrinkles 200 in the direction of the force. As shown in FIG. 5, a force applied diagonally with respect to the axis A of FIG. 3 will provide diagonal wrinkles 200. While not shown, the reversible wrinkles 200 can also be applied in the same direction as the direction of the irreversible wrinkles 100.

If the devices shown in FIG. 4 or 5 are heated to the transition temperature without the application of force and subsequently cooled without the application of force, the reversible wrinkles 200 will no longer appear, but the irreversible wrinkles 100 will remain. This is because the wrinkles 100 are part of the "memory" of the bilayer 10 in its original shape. In various embodiments, the process of adding and removing the reversible wrinkles 200 can be repeated using the same or different directions of force and/or amounts of force.

In various embodiments, the wrinkles 100 and/or 200 may show strong angle dependent colors, reflecting their diffraction nature. By tilting a bilayer 10 formed according to the present teachings, the colors reflected change gradually and can reflect the entire visible spectrum. Variations in the thickness of the rigid film layer 14 or the shape memory polymer 12, the compressive load applied, the proximity of adjacent deformations, and other factors can be varied to provide designs, logos, or otherwise manipulate the color reflection.

This color manipulation begins with the selection of the appropriate thickness of the rigid film layer 14. The thickness of the rigid film layer 14 should be commensurate with the desired wavelength of light or light reflection that is desired from the wrinkle or sets of wrinkles. The wavelength of light reflected by wrinkles is determined using the following equation in which $\lambda$ is the dominant wavelength, h is the thickness of the rigid film layer 14, E and v are the Young's Modulus and Poisson's Ration of substrate (s) and film (f).

$$\lambda = 2\pi h \left[ \frac{(1-v_s^2)E_f}{3(1-v_f^2)E_s} \right]^{1/3}$$

As is known in the art, and is further demonstrated by the equation, when there is uniaxial force, there is a direct proportionality of the wavelength and the thickness of the rigid film layer 14. Further, there is an increase in wavelength with a decrease in the rigidity of the substrate or shape memory polymer 12.

It is believed that increasing rigid film layer 14 thickness leads to increase in both wrinkle wavelength and amplitude. Accordingly, wrinkle geometry for the irreversible wrinkles 100 and/or the reversible wrinkles 200 can be tuned by adjusting the thickness of the rigid film layer 14. Still further, with respect to FIG. 2, for example, elongating the rigid film layer 14 and subsequently the undulations 16 and any wrinkles formed thereon also provides color changes and can be used to provide an array of colors, a single color, or a mirror-like finish.

Further, in various embodiments, the distribution of the wrinkles and colors is controlled. The distribution and geometry of the wrinkles reflects the lateral strain history at both macroscopic and microscopic scales. A shape memory polymer in the absence of surface wrinkles is capable of recording strain but not strain history. The present teachings facilitate recording the strain history through the rigid film layer 14 and the resultant wrinkles 100 and/or 200 and their respective reflected colors. The methods of the present teachings utilize these and other techniques to capture the strain history for an attractive for display.

EXAMPLES

Materials: The epoxy liquid mixture consisted of an aromatic diepoxide (sold under the tradename D.E.R. 383 (3.6 grams or 0.01 moles) by Dow Chemical of Midland, Mich., USA), an aliphatic diepoxide (sold as NGDE 2.16 grams or 0.01 moles by Hexion Specialty Chemicals/Momentive of Columbus, Ohio, USA), and an aliphatic diamine curing agent (sold under the tradename Jeffamine D-230, 2.3 grams or 0.01 moles by Huntsman Performance Products of The Woodlands, Tex.). The mixture was cured at 100 degrees C. for 1 hour and at 130 degrees C. for 1 hour to obtain the shape memory polymer.

Wrinkle formation: An indenter with protruded letters was manually pressed onto a shape memory polymer surface preheated at 80 degrees C. for 20 minutes. After a cool-down to ambient temperature under the load, the indented shape memory polymer was coated at room temperature with a "white gold" film (palladium/gold alloy: atomic percentage 50/50) using a vacuum sputtering system (sold under the tradename Denton Desk II by Denton Vacuum LLC of Moorestown, N.J., USA). The film thickness was controlled by deposition time and measured directly by scanning electron microscopic analysis of the cross-sections. After the film deposition, the sample was heated to 80 degrees C. for 10 minutes to create spatially-localized wrinkles corresponding to the shape of the indenter.

The above process was also used to fabricate uniform wrinkle structures with only variations in the first deformation step. The deformation to create the uniformly distributed wrinkles was conducted in a typical tensile and force controlled mode using a dynamic mechanical analyzer (sold under the tradename DMA 2980 by TA Instruments of New Castle, Del., USA). In these experiments, a shape memory polymer sample was cut into rectangular strips (32×7×1 millimeters). The sample was uniaxially stretched at 65 degrees C. and the tensile deformation was subsequently fixed by cooling to 20 degrees C. under the load. The stretched sample was then removed from the dynamic mechanical analyzer and the strain was calculated based on the initial and final sample length. Samples of various strains were obtained by adjusting the tensile force in the thermo-mechanical stretching experiments.

Optical microscope: The optical images of localized wrinkled samples (logos and microscopically indented samples) were obtained on white light interferometer (sold under the tradename Zygo NewView 6000 Profilometer by Zygo of Middlefield, Conn., USA or sold under the tradename Veeco Optical Interferometer by Veeco Instruments, Inc. of Plainview, N.Y., USA).

Atomic Force Microscopy: AFM characterization of wrinkles was conducted under ambient conditions in a contact mode using a device sold under the tradename Dimension 3100 by Veeco Instruments, Inc. of Plainview, N.Y., USA. The wavelength and amplitude of wrinkles were obtained by measuring 80-100 individual wrinkles using the section analysis function in software having the tradename Nanoscope (5.31r1).

Optical Reflectance Measurement: Optical reflectance data were collected using a multi-angle spectrophotometer (sold under the tradename X-rite MA98 by X-Rite, Inc. of Grand Rapids, Mich., USA) with a wavelength range from 400 nanometers to 700 nanometers. The initial incident and reflection angles were both 45 degrees. Spectra were also collected by slightly tilting the sample at an angle of θ and the corresponding incident angle and reflection angle are 45 degrees −θ and 45 degrees +θ, respectively.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of creating reversible and irreversible wrinkle structures comprising:
    heating a shape memory polymer to a transition temperature and cooling the shape memory polymer while applying a first force;
    securing a rigid film layer to the shape memory polymer to form a bilayer;
    recovering an original shape of the shape memory polymer to create a first set of wrinkles in the rigid film layer; and
    heating the bilayer to the transition temperature and applying a second force to create a second set of wrinkles in the rigid film layer, wherein the first set of wrinkles is selected from reversible wrinkles or irreversible wrinkles and the second set of wrinkles is selected from the other of the reversible wrinkles or the irreversible wrinkles.

2. The method of claim 1, wherein the rigid film layer is shaped as a ribbon.

3. The method of claim 1, wherein the first set of wrinkles is formed in a first direction and the second set of wrinkles is formed in a second direction.

4. The method of claim 1, wherein the recovering comprises heating and cooling the bilayer to recover the original shape of the shape memory polymer.

5. The method of claim 1, further comprising selecting at least one of the first force and the second force to cause the rigid film layer to reflect a select wavelength of light.

6. The method of claim 1, further comprising cooling the bilayer having the first set of wrinkles after recovering the original shape of the shape memory polymer.

7. The method of claim 1, further comprising removing the second set of wrinkles by heating and cooling the bilayer without application of a force.

8. A method of creating reversible and irreversible wrinkle structures comprising:
    heating a shape memory polymer to a transition temperature;
    creating at least two zones of localized deformation by cooling the shape memory polymer while applying a first force;
    applying a rigid film layer over the shape memory polymer to form a bilayer;
    recovering an original shape of the shape memory polymer while creating a first set of wrinkles in the rigid film layer on at least one of the zones of localized deformation; and
    heating the bilayer to the transition temperature and applying a second force to create a second set of wrinkles in the rigid film layer, wherein the second set of wrinkles is located immediately adjacent one of the zones of localized deformation, wherein the first set of wrinkles is selected from reversible wrinkles or irreversible wrinkles and the second set of wrinkles is selected from the other of the reversible wrinkles or the irreversible wrinkles.

9. The method of claim 8, wherein the rigid film layer is under a compressive force during the recovering of the original shape of the shape memory polymer.

10. The method of claim 8, wherein the rigid film layer is selected from the group consisting of metals, polymers, and inorganic materials.

11. The method of claim 8, wherein the first force is applied in a first direction and the second force is applied in a different direction.

12. The method of claim 8, wherein the first set of wrinkles is perpendicular to the second set of wrinkles.

13. The method of claim 8, further comprising selecting at least one of the first force and the second force to cause the rigid film layer to reflect a select wavelength of light.

14. The method of claim 8, further comprising cooling the bilayer after application of the second force.

15. The method of claim 14, further comprising removing the second set of wrinkles by heating and cooling the bilayer without application of a force.

16. The method of claim 8, wherein the first set of wrinkles is irreversible.

17. The method of claim 8, wherein the second set of wrinkles is irreversible.

18. A method of creating a wrinkled structure comprising:
    securing a rigid film layer at discrete attachment points to a two-way shape memory polymer to form a bilayer, wherein the rigid film layer forms a ribbon-like structure comprising a plurality of undulations;
    heating the bilayer to a transition temperature and applying a first force to change a dimension of the bilayer having the ribbon-like structure comprising the plurality of undulations; and
    cooling the bilayer having the changed dimension while maintaining the first force.

19. The method of claim 18, further comprising heating and cooling the bilayer while applying a second force.

* * * * *